United States Patent
Mizuno

(10) Patent No.: US 7,760,779 B2
(45) Date of Patent: Jul. 20, 2010

(54) LASER DRIVER, METHOD FOR DRIVING LASER, AND RECORDING/READING EQUIPMENT

(75) Inventor: Haruhiko Mizuno, Osaka (JP)

(73) Assignee: Panasonic Corporation, Osaka (JP)

( * ) Notice: Subject to any disclaimer, the term of this patent is extended or adjusted under 35 U.S.C. 154(b) by 620 days.

(21) Appl. No.: 11/697,068

(22) Filed: Apr. 5, 2007

(65) Prior Publication Data
US 2007/0253313 A1 Nov. 1, 2007

(30) Foreign Application Priority Data
Apr. 26, 2006 (JP) ............... 2006-122321

(51) Int. Cl.
*H01S 3/00* (2006.01)
*H01S 3/13* (2006.01)

(52) U.S. Cl. .............. 372/38.02; 372/8; 372/38.07; 372/38.01; 372/29.015; 372/29.011; 372/29.01

(58) Field of Classification Search .............. 372/8, 372/29.01, 29.011, 29.012, 38.01, 38.02, 372/38.07
See application file for complete search history.

(56) References Cited

U.S. PATENT DOCUMENTS

| | | | | |
|---|---|---|---|---|
| 5,036,519 A | * | 7/1991 | Ema et al. .............. | 372/29.011 |
| 5,732,096 A | * | 3/1998 | Suzuki et al. ............. | 372/38.01 |
| 6,741,622 B2 | * | 5/2004 | Otsuka .................... | 372/38.07 |
| 2003/0210084 A1 | * | 11/2003 | Kabayama et al. .......... | 327/165 |
| 2005/0069002 A1 | * | 3/2005 | Senga et al. ............. | 372/38.01 |

FOREIGN PATENT DOCUMENTS

JP    2003-324339    11/2003

* cited by examiner

*Primary Examiner*—Minsun Harvey
*Assistant Examiner*—Delma R Forde
(74) *Attorney, Agent, or Firm*—Hamre, Schumann, Mueller & Larson, P.C.

(57) ABSTRACT

The laser drive circuit of the present invention includes a first drive circuit 105 receiving an input of a current from a variable current source 103 and a first pulse control signal 101 and outputting a first drive current in synchronism with the first pulse control signal 101; a pulse output circuit 107 outputting a pulse signal in response to a falling edge of the first pulse control signal 101; and a second drive circuit 106 receiving an input of a current from a variable current source 104 and a second pulse control signal 102, generating a second drive current in synchronism with the second pulse control signal 102, and outputting a decreased current value of the second drive current at least in synchronism with the pulse signal. According to this configuration, the falling time of the pulse can be shortened regardless of the relationship between the voltage of a laser connecting terminal and the power source voltage of a drive circuit or a ground voltage.

11 Claims, 11 Drawing Sheets

(a) Pulse control signal 101

(b) Output pulse of pulse output circuit 107

(c) Output current waveform($I_1$) of first drive circuit 105

(d) Output current waveform($I_2$) of second drive circuit 106

(e) Drive current waveform($I_1 + I_2$) of laser diode 109

LASER DRIVER, METHOD FOR DRIVING LASER, AND RECORDING/READING EQUIPMENT

BACKGROUND OF THE INVENTION

1. Field of the Invention

The present invention relates to a laser drive circuit for driving a laser device for emitting laser light and to a method for driving a laser. More particularly, this invention relates to recording/reading equipment for recording video information onto optical disks such as CDs, DVDs and Blu-ray Disks (BDs) or reading information recorded on an optical disk.

2. Description of Related Art

Semiconductor laser devices usually are used to record recording marks on optical disks. In order to prevent the recording marks from deforming into oval shapes, laser devices are configured to emit pulsed light so as to control the heat during recording. With the increase of recording speed in recent years, the pulse widths have become shorter. Along with this trend, demand is increasing for laser drive circuits that have short rising and falling times and are capable of faster switching.

An example of a conventional laser drive circuit is disclosed in JP 2003-324339A. FIG. 11 is a circuit diagram showing a configuration of a laser drive circuit disclosed in JP 2003-324339A. As shown in FIG. 11, p-channel type (hereinafter simply referred to as "p-ch") MOS transistors 1116 and 1117 and n-channel type (hereinafter simply referred to as "n-ch") MOS transistors 1112 and 1113 are connected in series between a power source Vcc and ground. A laser diode 1109 capable of emitting laser light is connected between an IC output terminal 1108 and the power source Vcc.

FIG. 12 shows the signal waveforms of the components of the laser drive circuit shown in FIG. 11. FIG. 12 shows only a falling edge of an input pulse 1120. FIG. 12(a) shows the waveform of the input pulse 1120. FIG. 12(b) shows the waveform of the output current of the transistor 1112. FIG. 12(c) shows the waveform of a correction pulse 1121. FIG. 12(d) shows the waveform of the output current of the transistor 1116. FIG. 12(e) is the waveform of a current applied to the laser diode 1109.

As shown in FIG. 11, a voltage from a bias voltage source 1118 is applied to the gate of the n-chMOS transistor 1112. Between the source of this n-chMOS transistor 1112 and ground, the n-chMOS transistor 1113 is connected in series. The n-chMOS transistor 1112 switches on/off the output current at high speed (see FIG. 12(b)), in accordance with the input pulse 1120 applied to the gate of the n-chMOS transistor 1113 (see FIG. 12(a)).

A voltage from another bias voltage source 1119 is applied to the gate of the p-chMOS transistor 1116. The p-chMOS transistor 1116 is connected to the output terminal 1108. Between the source of the p-chMOS transistor 1116 and the power source, the p-chMOS transistor 1117 is connected in series. The correction pulse 1121 (see FIG. 12(c)) is applied to the gate of the p-chMOS transistor 1117 in accordance with the input pulse 1120. When the n-chMOS transistor 1113 is turned off, the p-chMOS transistor 1116 discharges current as shown in FIG. 12(d), whereby the falling time of a current applied to the laser diode 1109 can be shortened as shown in FIG. 12(e).

FIG. 12(b) shows a current waveform without the correction by the correction pulse. The falling time is indicated by t11. FIG. 12(e) shows a current waveform with correction by the correction pulse. The falling time is indicated by t12. The falling times t11 and t12 satisfy t11>t12.

However, according to the configuration disclosed by JP 2003-324339A, the voltage at the laser connecting terminal 1108 may become higher than the power source voltage of the drive circuit due to the characteristics and variations of the laser diode 1109. If the terminal voltage of the laser connecting terminal 1108 is higher than the drain voltage of the p-chMOS transistor 1116, the p-chMOS transistor 1116 cannot discharge the current (see FIG. 12(d)), and the output current from the transistor 1112 shown in FIG. 12(b) cannot be corrected. As a result, the falling time of the pulse cannot be shortened. In other words, the current shown in FIG. 12(b) is outputted directly from the transistor 1112.

SUMMARY OF THE INVENTION

Therefore, with the foregoing in mind, it is an object of the present invention to provide a laser drive circuit capable of offering a short pulse falling time regardless of the relationship between the voltage of the laser connecting terminal and the power source voltage of the drive circuit or the relationship between the voltage of the laser connecting terminal and a ground voltage. Another object of the present invention is to provide a laser driving method suitable for the laser drive circuit. Another object of the present invention is to provide a recording/reading equipment including the laser drive circuit.

The laser drive circuit of the present invention is a laser drive circuit for generating a drive current for driving a laser diode according to inputted first and second variable currents and inputted first and second pulse control signals, the laser drive circuit comprising: a first drive circuit receiving an input of the first variable current and the first pulse control signal and outputting a first drive current in synchronism with the first pulse control signal; a pulse output circuit outputting a pulse signal in response to a falling edge of the first pulse control signal; and a second drive circuit receiving an input of the second variable current and the second pulse control signal, generating a second drive current in synchronism with the second pulse control signal, and with decreased current value at least in synchronism with the pulse signal, wherein the laser diode is driven by a current obtained by adding the output current of the first drive circuit and the output current of the second drive circuit.

The laser driving method of the present invention comprises the steps of (1) amplifying a first variable current source to turn on/off an output according to a first pulse control signal, (2) amplifying a second variable current source to turn on/off an output according to a second pulse control signal, (3) generating a pulse signal in response to an edge of the first pulse control signal, (4) changing a output current with the pulse signal, and (5) adding the amplified currents and applying the added currents to a laser.

According to the present invention, it is possible to shorten the falling time of the drive pulse of the laser element and thus to improve the recording quality of recording marks on optical disks.

DETAILED DESCRIPTION OF THE INVENTION

Figure 1:
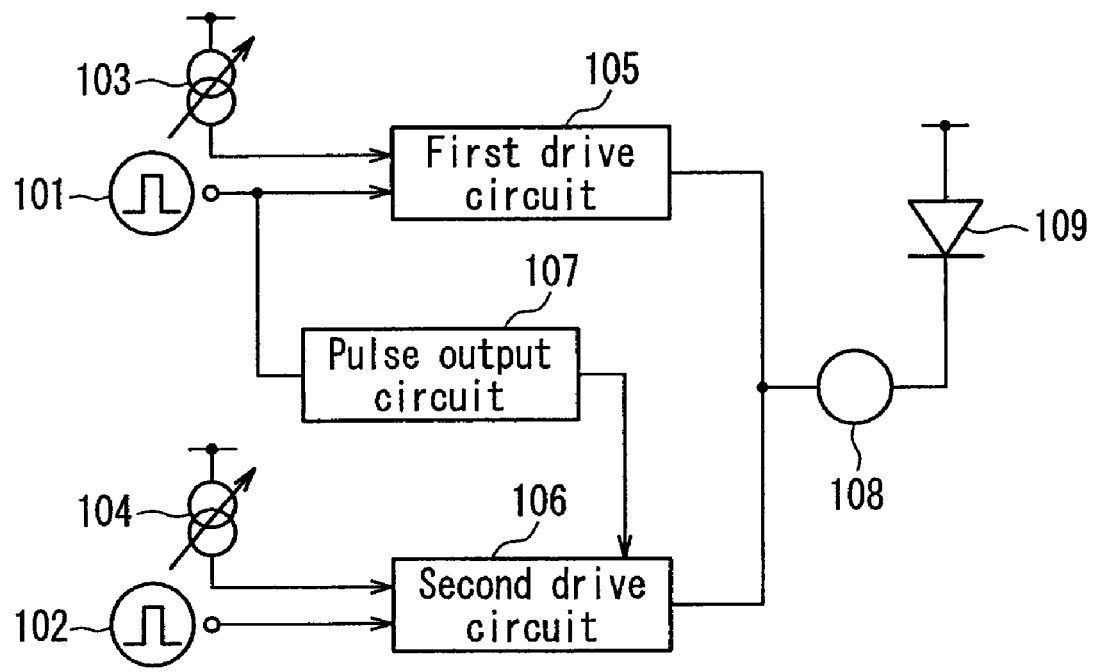
FIG. 1 is a circuit diagram showing a configuration of a laser drive circuit according to a first embodiment of the present invention.

In the laser drive device of the present invention, the first or second drive circuit may be configured to amplify the variable current, turn on/off the output according to the pulse control signal, and change the current with the pulse output circuit.

The pulse output circuit may include a high pass filter.

The pulse output circuit may include a pulse signal generating circuit using an inverter delay.

The output level of the pulse output circuit may be controlled by a current value of the variable current.

It is preferable that the first drive circuit includes a first transistor, a second transistor, a third transistor and a fourth transistor, each of the transistors being a three-terminal transistor including a first terminal, a second terminal and a third terminal. A current flows from the first terminal to the third terminal according to a voltage between the second terminal and the third terminal. The second terminal of the first transistor is connected to a power source. The first transistor is connected in series between the third terminal of the second transistor and ground. The first terminal of the second transistor is connected to a first variable current source. The first and second terminals of the second transistor are connected to each other. The first pulse control signal is inputted into the second terminal of the third transistor. The third transistor is connected in series between the third terminal of the fourth transistor and ground. The first terminal of the fourth transistor is connected to the laser diode, and the second terminal of the fourth transistor is connected to the second terminal of the second transistor.

Also, it is preferable that the second drive circuit includes a first transistor, a second transistor, a third transistor, a fourth transistor, a fifth transistor and a sixth transistor, each of the transistors being a three-terminal transistor including a first terminal, a second terminal and a third terminal. A current flows from the first terminal to the third terminal according to a voltage between the second terminal and the third terminal. The second terminal of the first transistor is connected to a power source. The first transistor is connected in series between the third terminal of the second transistor and ground. The first terminal of the second transistor is connected to a second variable current source. The first and second terminals of the second transistor are connected to each other. The second pulse control signal is inputted into the second terminal of the third transistor. The third transistor is connected in series between the third terminal of the fourth transistor and ground. The first terminal of the fourth transistor is connected to the laser diode. The second terminal of the fourth transistor is connected to the second terminal of the second transistor. The second terminal of the fifth transistor is connected to an output terminal of the pulse output circuit. The fifth transistor is connected in series between the third terminal of the sixth transistor and ground. The first terminal of the sixth transistor is connected to the laser diode, and the second terminal of the sixth transistor is connected to the second terminal of the second transistor and the second terminal of the fourth transistor.

The second drive circuit may include a first transistor, a second transistor, a third transistor, a fourth transistor, a fifth transistor and a sixth transistor, each of the transistors being a three-terminal transistor including a first terminal, a second terminal and a third terminal. A current flows from the first terminal to the third terminal according to a voltage between the second terminal and the third terminal. The second terminal of the first transistor is connected to a power source. The first transistor is connected in series between the third terminal of the second transistor and ground. The first terminal of the second transistor is connected to a second variable current source. The first and second terminals of the second transistor are connected to each other. The second pulse control signal is inputted into the second terminal of the third transistor. The third transistor is connected in series between the third terminal of the fourth transistor and ground. The first terminal of the fourth transistor is connected to the laser diode. The second terminal of the fourth transistor is connected to the second terminal of the second transistor. The second terminal of the fifth transistor is connected to an output terminal of the pulse output circuit. The fifth transistor is connected in series between the third terminal of the sixth transistor and ground. The first terminal of the sixth transistor is connected to the first terminal of the second transistor, and the second terminal of the sixth transistor is connected to the second terminal of the second transistor and the second terminal of the fourth transistor.

The second drive circuit may include a first transistor, a second transistor, a third transistor, a fourth transistor, a fifth transistor and a sixth transistor, each of the transistors being a three-terminal transistor including a first terminal, a second terminal and a third terminal. A current flows from the first terminal to the third terminal according to a voltage between the second terminal and the third terminal. The second terminal of the first transistor is connected to a power source. The first transistor is connected in series between the third terminal of the second transistor and ground. The first terminal of the second transistor is connected to a second variable current source. The first and second terminals of the second transistor are connected to each other, the pulse control signal is inputted into the second terminal of the third transistor, the third transistor is connected in series between the third terminal of the fourth transistor and ground. The first terminal of the fourth transistor is connected to the laser diode. The second terminal of the fourth transistor is connected to the second terminal of the second transistor. The second terminal of the fifth transistor is connected to an output terminal of the pulse output circuit. The fifth transistor is connected in series between the third terminal of the sixth transistor and ground. The first terminal of the sixth transistor is connected to the first terminal of the second transistor, and the second terminal of the sixth transistor is connected to the second terminal of the second transistor of the first drive circuit.

As described above, by reducing the bias current of recorded waveforms that flows constantly at the time of falling of pulse waveform, it is possible to provide a circuit in which the falling time of the recorded pulse waveform is shortened regardless of the relationship between the voltage of a laser connecting terminal and the power source voltage of a drive circuit or the relationship between the voltage of a laser connecting terminal and a ground voltage.

Hereinafter, the present invention will be described by way of illustrative embodiments with reference to the drawings.

Embodiment 1

FIG. 1 is a circuit diagram showing a configuration of a laser drive circuit according to a first embodiment of the present invention. As shown in FIG. 1, a first drive circuit 105 amplifies a current that is set by a variable current source 103, generating a laser drive current. The first drive circuit 105 also turns on/off the laser drive current according to a pulse control signal 101.

A second drive circuit 106 amplifies a current that is set by a variable current source 104, generating a laser drive current. The second drive circuit 106 also turns on/off the laser drive current according to a pulse control signal 102. The second drive circuit 106 is connected to a pulse output circuit 107, which outputs a short pulse in response to a falling edge of the pulse control signal 101. The currents outputted from the first drive circuit 105 and the second drive circuit 106 are combined to drive a laser diode 109.

Figure 2:
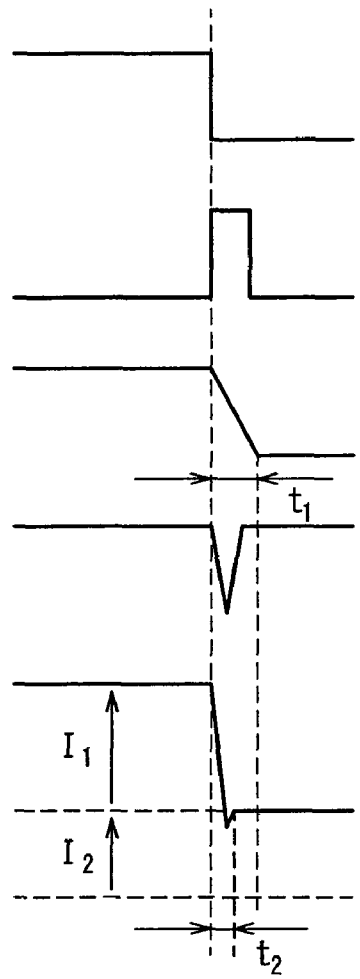
FIG. 2 is a waveform diagram showing the recorded waveforms of a laser drive circuit according to a first embodiment of the present invention.

FIG. 2 is a diagram showing the current waveforms of the laser drive circuit shown in FIG. 1. FIG. 2(a) shows the waveform of the pulse control signal 101. FIG. 2(b) shows the waveform of the output pulse from the pulse output circuit 107. This pulse signal goes high in response to a falling edge of the pulse control signal as shown in FIG. 2(a). FIG. 2(c) shows a waveform of the output current I1 of the first drive circuit 105. The output current shown in FIG. 2(c) is a current outputted from the variable current source 103 which is switched on/off according to the pulse control signal 101 shown in FIG. 2(a). FIG. 2(d) shows the waveform of the output current I2 of the second drive circuit 106. The waveform shown in FIG. 2(d) is a current outputted from the variable current source 104, which is decreased momentarily in synchronism with the output pulse of the pulse output circuit 107 shown in FIG. 2(b). FIG. 2(e) shows the waveform of a drive current inputted into the laser diode 109. The drive current shown in FIG. 2(e) is a current obtained by addition of the current I1 outputted from the first drive circuit 105 and the current I2 outputted from the second drive circuit 106. In FIG. 2, t1 represents a falling time of the output current I1 of the first drive circuit 105. Moreover, t2 represents a falling time of the drive current waveform of the laser diode 109.

As shown in FIGS. 1 and 2, the direct current generated by the variable current source 103 and the pulse control signal 101 shown in FIG. 2(a) are inputted into the first drive circuit 105. The first drive circuit 105 outputs the current I1 shown in FIG. 2(c) by turning on/off the current from the variable current source 103 in synchronism with the rising and falling of the pulse control signal 101.

The pulse control signal 101 is inputted also to the pulse output circuit 107. The pulse output circuit 107 outputs a pulse (see FIG. 2(b)) in synchronism with the falling of the pulse control signal 101. The outputted pulse is inputted into the second drive circuit 106.

The second drive circuit 106 outputs the current I2, i.e., the direct current generated by the variable current source 104, which is decreased momentarily in synchronism with the pulse outputted from the pulse output circuit 107 (see FIG. 2(d)).

The current (see FIG. 2(e)) obtained by addition of the current I1 outputted from the first drive circuit 105 and the current I2 outputted from the second drive circuit 106 is inputted into the laser diode 109 through an output terminal 108. Thereby, the laser diode 109 repeats its on/off operation, so that laser light is outputted intermittently.

As described above, when the pulse control signal 101 changes from high to low and the output current I1 of the first drive circuit 105 is turned off, by momentarily decreasing the output current I2 of the second drive circuit 106 according to the pulse outputted from the pulse output circuit 107, it is possible to shorten the falling time t2 of the drive current of the laser diode 109.

Because this configuration does not employ a current flowing in the discharging direction, even when the laser connecting terminal 108 has a potential higher than the power source voltage of the laser drive circuit, it is possible to perform the desired operation and to shorten the falling time of the pulse regardless of the relation of the voltage of the laser connecting terminal and the power source voltage of the drive circuit.

Figure 3:
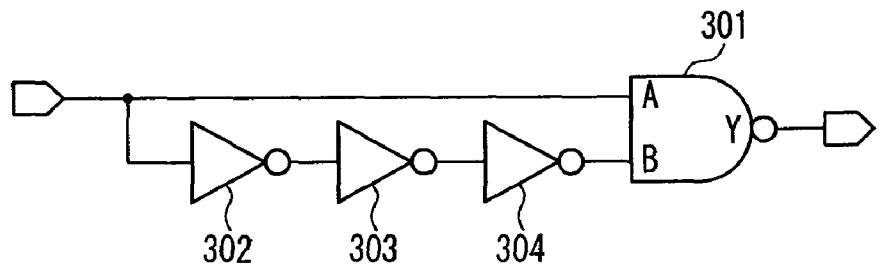
FIG. 3 is a circuit diagram showing an example of a configuration of a pulse output circuit according to a first embodiment of the present invention.

FIG. 3 shows a specific example of the pulse output circuit. This pulse output circuit is made of a pulse signal generating circuit utilizing the delay of inverters. In FIG. 3, when a pulse signal is inputted into the input terminal A of a NAND gate 301, an inverted pulse signal delayed by inverters 302, 303 and 304 is inputted into the output terminal B. Accordingly, the output terminal Y of the NAND gate 301 outputs a narrow pulse in synchronism with the falling of the pulse signal. The width of the output pulse can be adjusted by changing the number of inverters.

As an alternative to the configuration shown in FIG. 3, the pulse output circuit further may include a high pass filter (not shown) including a capacitance and a resistance connected to each other. Because this high pass filter differentiates the pulse control signal, it is possible to obtain a narrow pulse signal in synchronism with the falling of the pulse control signal. In this case, the pulse width can be adjusted by the time constant determined by the resistance and the capacitance.

Embodiment 2

Figure 4:
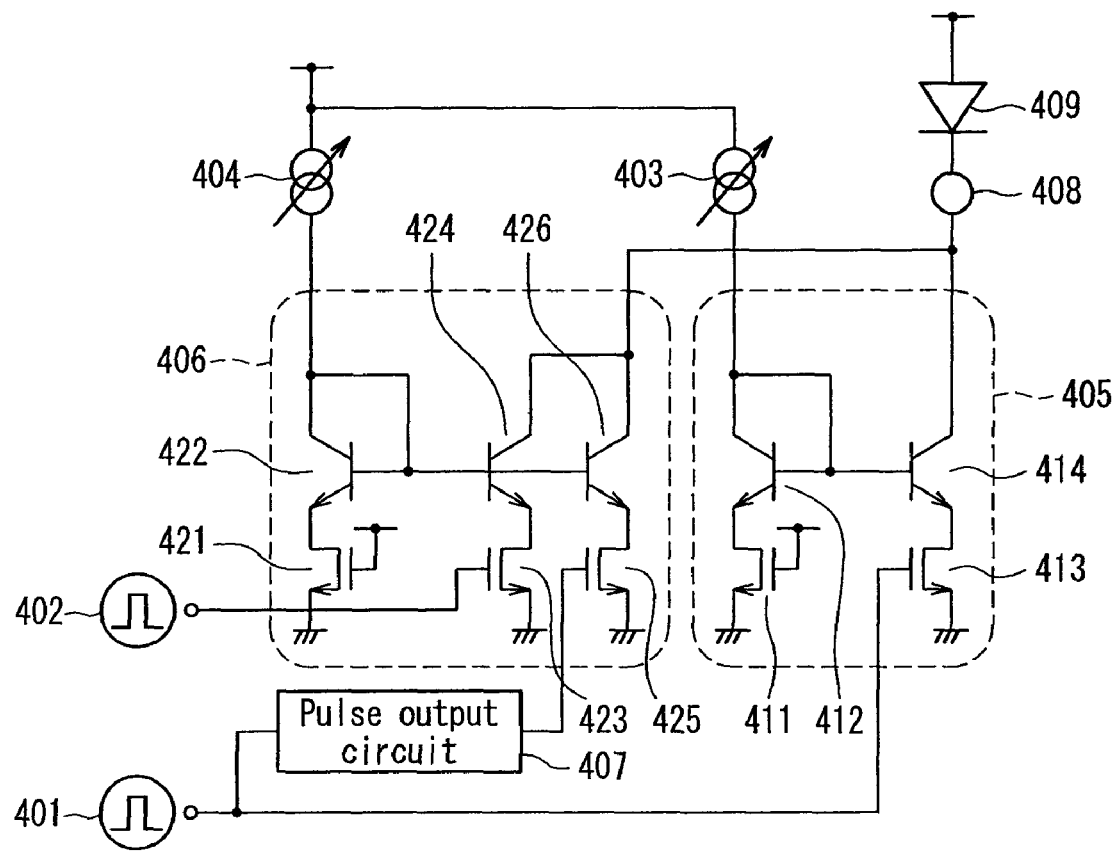
FIG. 4 is a circuit diagram showing a configuration of a laser drive circuit according to a second embodiment of the present invention.

FIG. 4 is a circuit diagram showing a configuration of a laser drive circuit according to a second embodiment of the present invention. FIG. 4 shows a specific circuit configuration of the first and second drive circuits 105 and 106 of FIG. 1.

As shown in FIG. 4, the laser drive circuit includes variable current sources 403 and 404, a first drive circuit 405, a second drive circuit 406, a pulse output circuit 407 and a laser diode 409. The pulse output circuit 407 outputs a short-period pulse according to a pulse control signal 401. The laser diode 409 outputs laser light according to the current inputted.

The first drive circuit 405 includes an n-chMOS transistor 411 (first transistor), an NPN transistor 412 (second transistor), an n-chMOS transistor 413 (third transistor) and an NPN transistor 414 (fourth transistor). The NPN transistor 412 and the NPN transistor 414 together form a current mirror circuit that amplifies the current value set by the variable current source 403 to a current value necessary to drive the laser diode 409. Between the emitter of this NPN transistor 414 and ground, the n-chMOS transistor 413 is connected in series.

The pulse control signal 401 is inputted into the gate of this n-chMOS transistor 413, which switches on/off the output current at high speed.

The second drive circuit 406 includes an n-chMOS transistor 421 (fifth transistor), an NPN transistor 422 (sixth transistor), an n-chMOS transistor 423 (seventh transistor), an NPN transistor 424 (eighth transistor), an n-chMOS transistor 425 (ninth transistor) and an NPN transistor 426 (tenth transistor). The configuration of the second drive circuit 406 is basically the same as that of the first drive circuit 405 except that the NPN transistor 426 is connected to the output side of the current mirror circuit and that the n-chMOS transistor 425 is connected in series between the emitter of the NPN transistor 426 and ground. A signal from the pulse output circuit 407 for outputting a short pulse signal in response to a falling edge of the pulse control signal 401 is inputted into the gate of this n-chMOS transistor 425.

Figure 5:
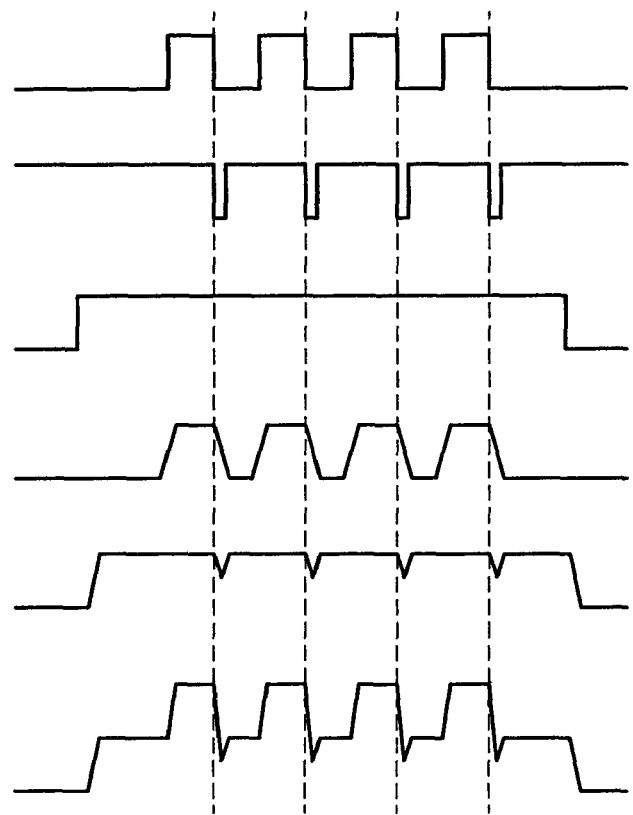
FIG. 5 is a waveform diagram showing the recorded waveforms of a laser drive circuit according to a second embodiment of the present invention.

FIG. 5 shows the pulse waveforms and current waveforms of the components of the laser drive circuit of FIG. 4. FIG. 5(a) shows a pulse of the inputted pulse control signal 401. FIG. 5(b) shows an output pulse of the pulse output circuit 407. FIG. 5(c) shows a pulse of the inputted pulse control signal 402. FIG. 5(d) shows an output current waveform of the first drive circuit 405. FIG. 5(e) shows an output current waveform of the second drive circuit 406. The waveform of FIG. 5(e) corresponds to the correction pulse for shortening the falling time of the current waveform shown in FIG. 5(d). FIG. 5(f) shows a drive current waveform of the laser diode 409. The waveform shown in FIG. 5(f) corresponds to the waveform obtained by combining the waveform shown in FIG. 5(d) and the waveform shown in FIG. 5(e).

The first drive circuit 405 outputs a current shown in FIG. 5(d) according to the inputted pulse control signal 401 (see FIG. 5(a)). The pulse control signal 401 is inputted also to the pulse output circuit 407. The pulse output circuit 407 outputs an L signal shown in FIG. 5(b) at the timing of the falling of the pulse control signal 401 shown in FIG. 5(a). The L signal is inputted into the second drive circuit 406. The second drive circuit 406 outputs a current shown in FIG. 5(e) according to the inputted pulse control signal (see FIG. 5(c)) and the output pulse of the pulse output circuit 407.

In the second drive circuit 406, by momentarily reducing the mirror ratio of the current mirror circuit, a current having a waveform as shown in FIG. 5(e) can be obtained. By adding this current to the output current of the first drive circuit 405, it is possible to shorten the falling time of the drive current of the laser diode 409 (see FIG. 5(f)).

According to the configuration shown in FIG. 4, the collector and base of the NPN transistor 412 are connected, but it is also possible to connect an NPN transistor for compensating the base current between the collector and base.

Also, according to the configuration shown in FIG. 4, the current mirror circuit is formed by the NPN transistors, but the current mirror circuit also may be formed by n-chMOS transistors.

Embodiment 3

Figure 6:
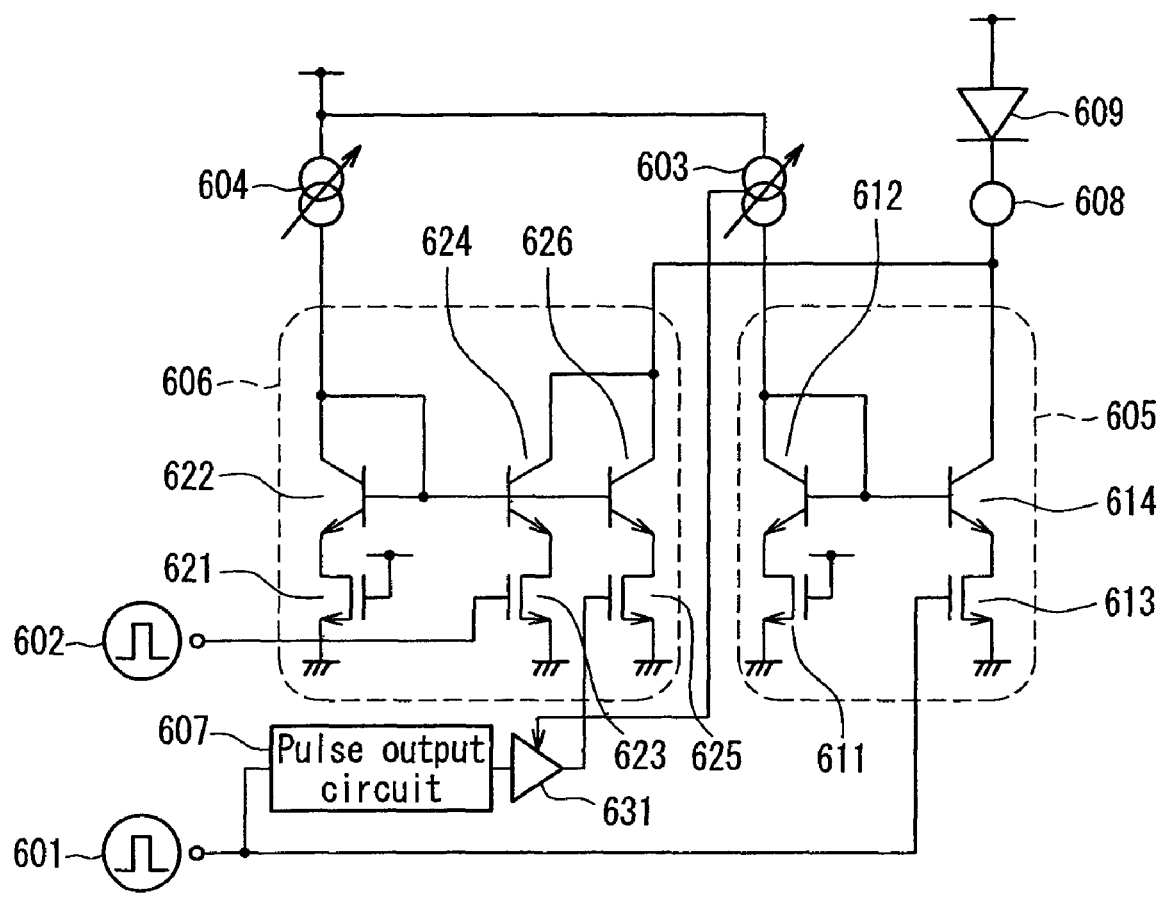
FIG. 6 is a circuit diagram showing a configuration of a laser drive circuit according to a third embodiment of the present invention.

FIG. 6 is a circuit diagram showing a configuration of a laser drive circuit according to a third embodiment of the present invention. According to the configuration of FIG. 6, an output voltage control circuit 631 is connected between a pulse output circuit 607 and an n-chMOS transistor 625. In FIG. 6, a detailed description of the same components as those of FIG. 4 will be omitted.

As shown in FIG. 6, the laser drive circuit includes variable current sources 603 and 604, a first drive circuit 605, a second drive circuit 606, a pulse output circuit 607, a laser diode 609 and an output voltage control circuit 631. The pulse output circuit 607 outputs a short-period pulse according to a pulse control signal 601. The laser diode 609 outputs laser light according to the inputted current.

The first drive circuit 605 includes an n-chMOS transistor 611 (first transistor), an NPN transistor 612 (second transistor), an n-chMOS transistor 613 (third transistor) and an NPN transistor 614 (fourth transistor). The NPN transistor 612 and the NPN transistor 614 together form a current mirror circuit. The current mirror circuit amplifies the current value set by the variable current source 603 to a current value necessary to drive the laser diode 609. Between the emitter of the NPN transistor 614 and ground, the n-chMOS transistor 613 is connected in series. A pulse control signal 601 is inputted into the gate of this n-chMOS transistor 613, which switches on/off the output current at high speed.

The second drive circuit 606 includes an n-chMOS transistor 621 (fifth transistor), an NPN transistor 622 (sixth transistor), an n-chMOS transistor 623 (seventh transistor), an NPN transistor 624 (eighth transistor), an n-chMOS transistor 625 (ninth transistor) and an NPN transistor 626 (tenth transistor). The configuration of the second drive circuit 606 is basically the same as that of the first drive circuit 605 except that the NPN transistor 626 is connected to the output side of the current mirror circuit and that the n-chMOS transistor 625 is connected in series between the emitter of the NPN transistor 626 and ground. A signal from the pulse output circuit 607 for outputting a short pulse signal in response to a falling edge of the pulse control signal 601 is inputted into the gate of the n-chMOS transistor 625 through the output voltage control circuit 631.

Because the output voltage control circuit 631 is controlled by the current value of the variable current source 603, the gate potential when the n-chMOS transistor 625 is turned off can be controlled by the output current value of the first drive circuit 605. Accordingly, by changing the on resistance of the n-chMOS transistor 625, the reduction amount of the output current of the second drive circuit 606 can be changed.

The configuration according to this embodiment is useful when the set current range of the variable current source 603 is broad because the slew rate for the falling edge needs to be increased as the output current value from the first drive circuit 605 increases.

Embodiment 4

Figure 7:
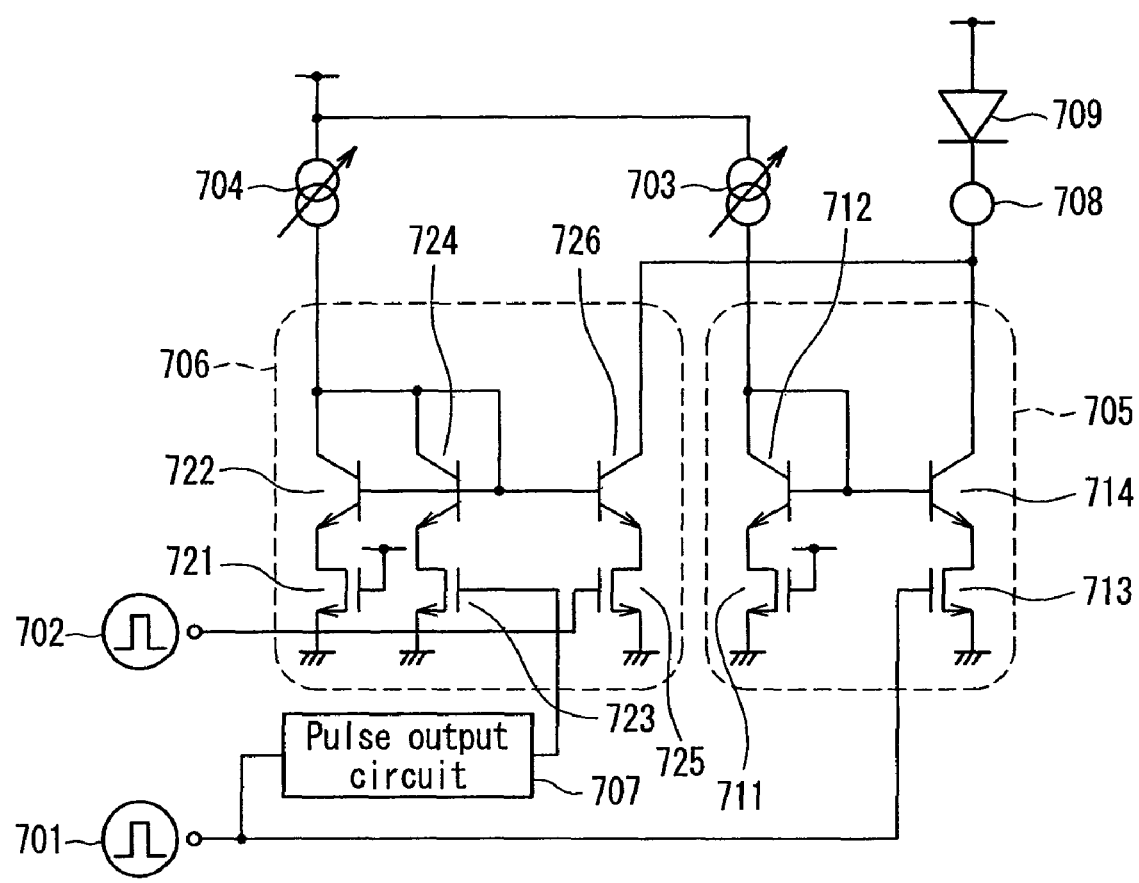
FIG. 7 is a circuit diagram showing a configuration of a laser drive circuit according to a fourth embodiment of the present invention.

FIG. 7 is a circuit diagram showing a configuration of a laser drive circuit according to a fourth embodiment of the present invention. This fourth embodiment is characterized by a configuration in which in a second drive circuit 706, an n-chMOS transistor 723 connected to a pulse output circuit 707 and an NPN transistor 724 are connected to the input side of the current mirror circuit. In FIG. 7, a detailed description of the same components as those of FIG. 4 will be omitted.

As shown in FIG. 7, the laser drive circuit includes variable current sources 703 and 704, a first drive circuit 705, a second drive circuit 706 and a laser diode 709. A pulse output circuit 707 outputs a short-period pulse according to a pulse control signal 701. The laser diode 709 outputs laser light according to the inputted current.

The first drive circuit 705 includes an n-chMOS transistor 711 (first transistor), an NPN transistor 712 (second transistor), an n-chMOS transistor 713 (third transistor) and an NPN transistor 714 (fourth transistor). The NPN transistor 712 and the NPN transistor 714 together form a current mirror circuit. The current mirror circuit amplifies the current value set by the variable current source 703 to a current value necessary to drive the laser diode 709. Between the emitter of this NPN transistor 714 and ground, the n-chMOS transistor 713 is connected in series. A pulse control signal 701 is inputted into the gate of this n-chMOS transistor 713, which switches on/off the output current at high speed.

The second drive circuit 706 includes an n-chMOS transistor 721 (fifth transistor), an NPN transistor 722 (sixth transistor), an n-chMOS transistor 723 (seventh transistor), an NPN transistor 724 (eighth transistor), an n-chMOS transistor 725 (ninth transistor) and an NPN transistor 727 (tenth transistor). The configuration of the second drive circuit 706 is basically the same as that of the first drive circuit 705 except that a signal from the pulse output circuit 707 for outputting a short pulse signal in response to a falling edge of the pulse control signal 701 is inputted into the gate of the n-chMOS transistor 723.

Figure 8:
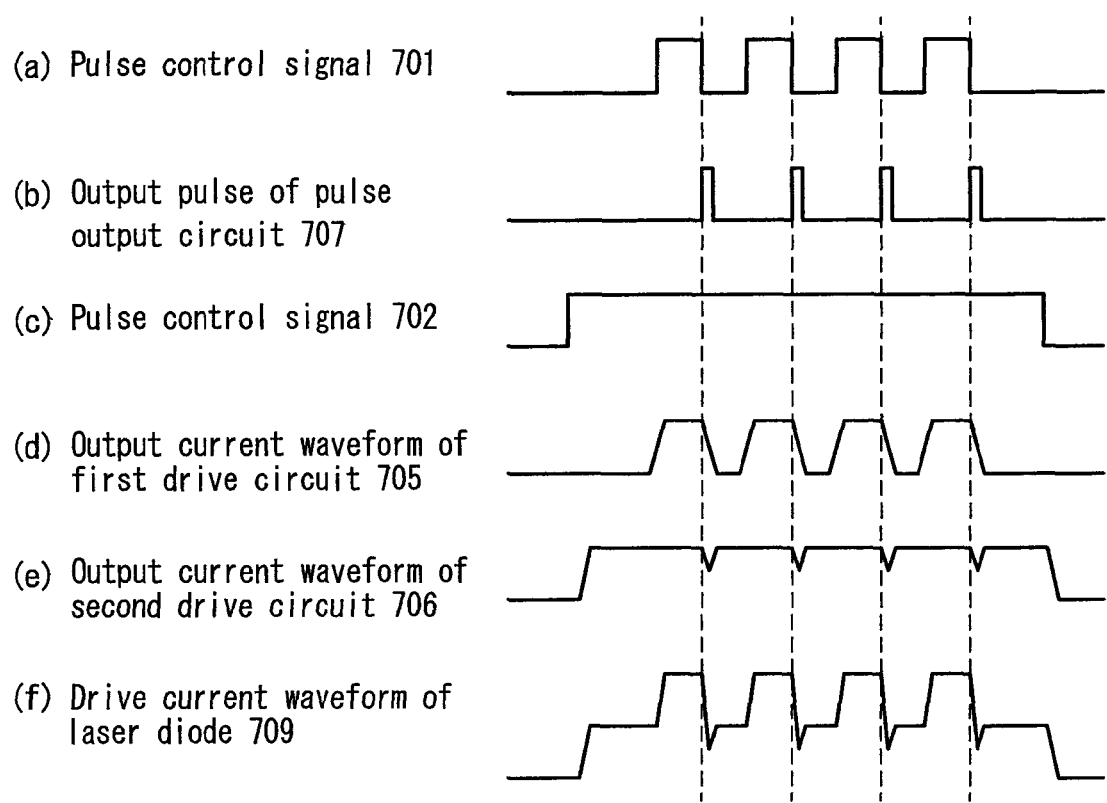
FIG. 8 is a waveform diagram showing the recorded waveforms of a laser drive circuit according to a fourth embodiment of the present invention.

FIG. 8 shows the pulse waveforms and current waveforms of the components of the laser drive circuit shown in FIG. 7. FIG. 8(a) shows a pulse of the inputted pulse control signal 701. FIG. 8(b) shows an output pulse of the pulse output circuit 707. FIG. 8(c) shows a pulse of an inputted pulse control signal 702. FIG. 8(d) shows an output current waveform of the first drive circuit 705. FIG. 8(e) shows an output current waveform of the second drive circuit 706. The waveform shown in FIG. 8(e) corresponds to the correction pulse for shortening the falling time of the current waveform shown in FIG. 8(d). FIG. 8(f) shows a drive current waveform of the laser diode 709. The waveform shown in FIG. 8(f) corresponds to the waveform obtained by adding the waveform shown in FIG. 8(d) and the waveform shown in FIG. 8(e).

As shown in FIG. 7, the pulse output circuit 707 has a polarity opposite to that of the pulse output circuit 407 described previously. Accordingly, the n-chMOS transistor 723 is turned on at each falling edge of the pulse control signal 701 (see FIG. 8(a)), and thus the mirror ratio of the current mirror circuit is reduced, whereby the output current from the second drive circuit 706 (see FIG. 8(e)) can be decreased momentarily, and the falling time of the drive current of the laser diode 709 can be shortened as shown in FIG. 8(f).

Embodiment 5

Figure 9:
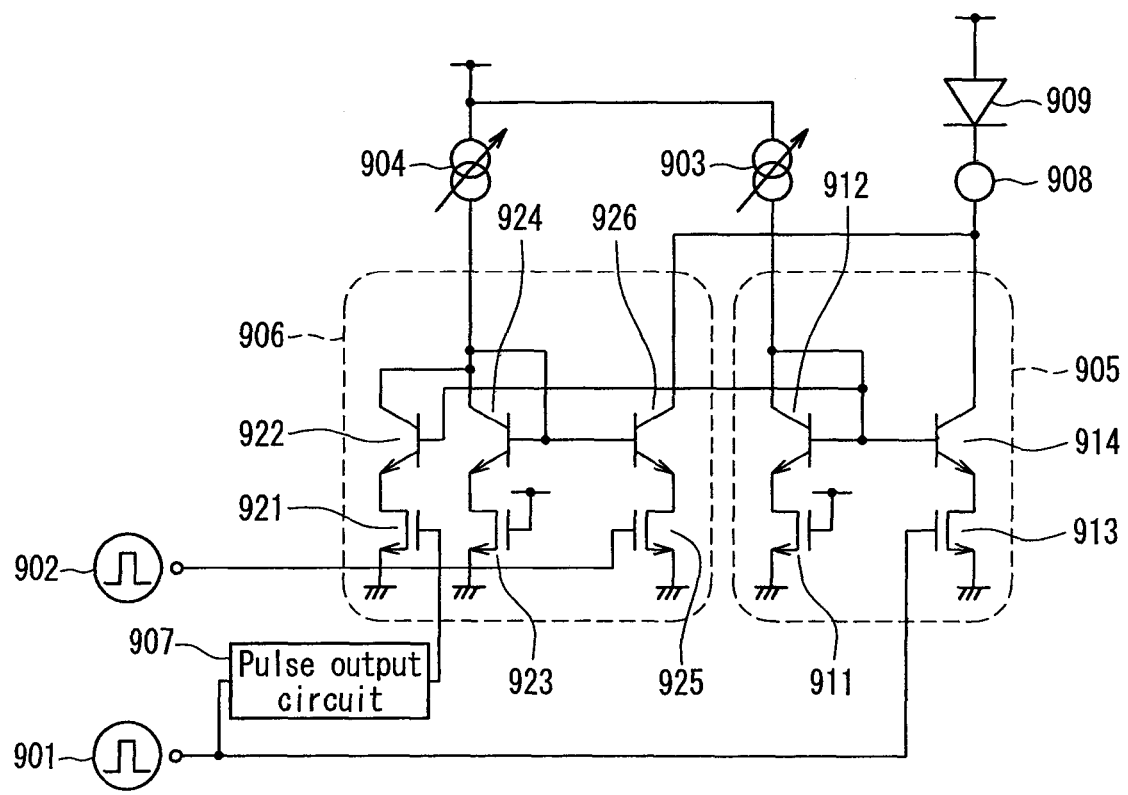
FIG. 9 is a circuit diagram showing a configuration of a laser drive circuit according to a fifth embodiment of the present invention.

FIG. 9 is a circuit diagram showing a configuration of a laser drive circuit according to a fifth embodiment of the present invention. The laser drive circuit of this embodiment has a circuit configuration in which, in the second drive circuit 706 of the fourth embodiment shown in FIG. 7, the base of the NPN transistor 714 is connected to the base of the NPN transistor 722 of the first drive circuit 705. In FIG. 9, a detailed description of the same components as those of FIG. 7 will be omitted.

As shown in FIG. 9, the laser drive circuit includes variable current sources 903 and 904, a first drive circuit 905, a second drive circuit 906, a pulse output circuit 907 and a laser diode 909. The pulse output circuit 907 outputs a short-period pulse according to a pulse control signal 901. The laser diode 909 outputs laser light according to the inputted current.

The first drive circuit 905 includes an n-chMOS transistor 911 (first transistor), an NPN transistor 912 (second transistor), an n-chMOS transistor 913 (third transistor) and an NPN transistor 914 (fourth transistor). The NPN transistor 912 and the NPN transistor 914 together form a current mirror circuit. The current mirror circuit amplifies the current value set by the variable current source 903 to a current value necessary to drive the laser diode 909. Between the emitter of the NPN transistor 914 and ground, the n-chMOS transistor 913 is connected in series. A pulse control signal 901 is inputted into the gate of this n-chMOS transistor 913, which switches on/off the output current at high speed.

The second drive circuit 906 includes an n-chMOS transistor 921 (fifth transistor), an NPN transistor 922 (sixth transistor), an n-chMOS transistor 923 (seventh transistor), an NPN transistor 924 (eighth transistor), an n-chMOS transistor 925 (ninth transistor) and an NPN transistor 926 (tenth transistor). In the second drive circuit 906, the pulse output circuit 907 is connected to the gate of the n-chMOS transistor 921. A second pulse control signal 902 is inputted into the gate of the n-chMOS transistor 925.

According to the configuration shown in FIG. 9, because the base potential of the NPN transistor 922 is determined according to the current value set by the variable current source 903, the reduction amount of the output current of the second drive circuit 906 can be changed according to the output current value of the first drive circuit 905.

The configuration according to this embodiment is useful when the set current range of the variable current source 903 is broad because the slew rate for the falling edge needs to be increased as the output current value from the first drive circuit 905 increases.

Embodiment 6

Figure 10:
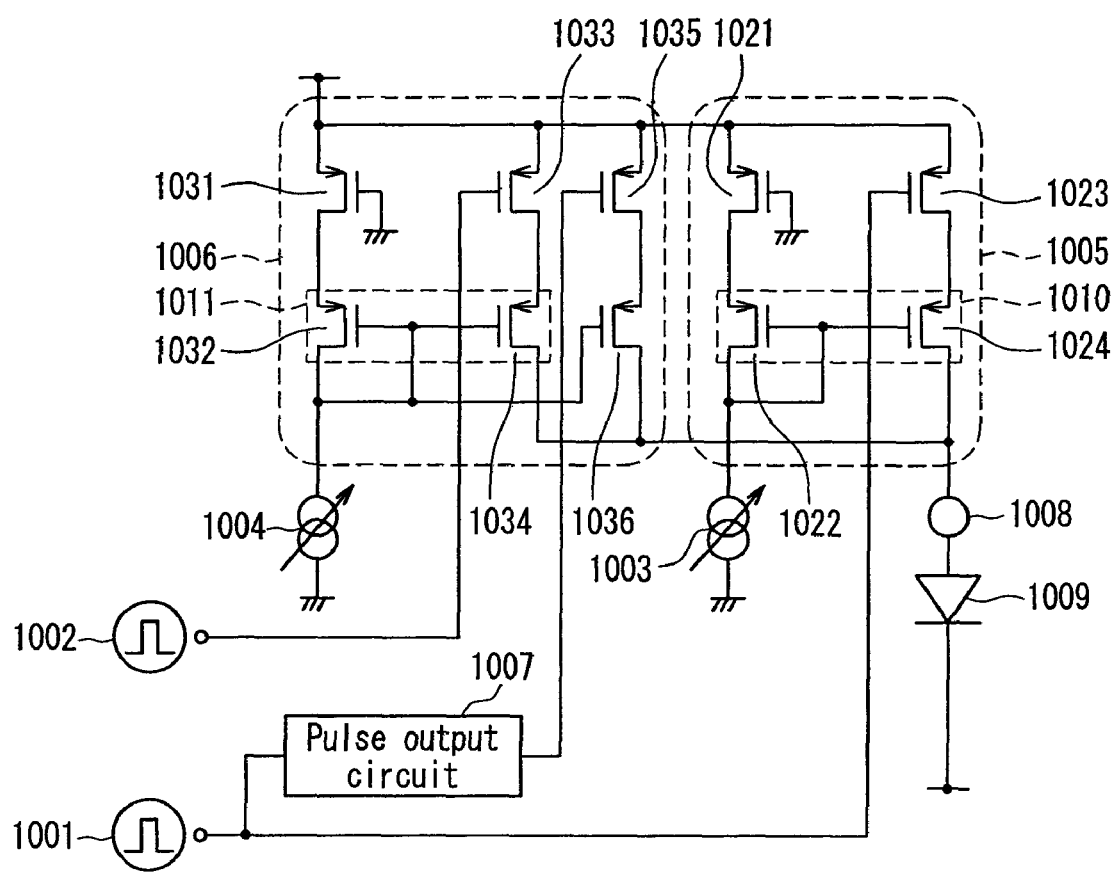
FIG. 10 is a circuit diagram showing a configuration of a laser drive circuit according to a sixth embodiment of the present invention.
Figure 11:
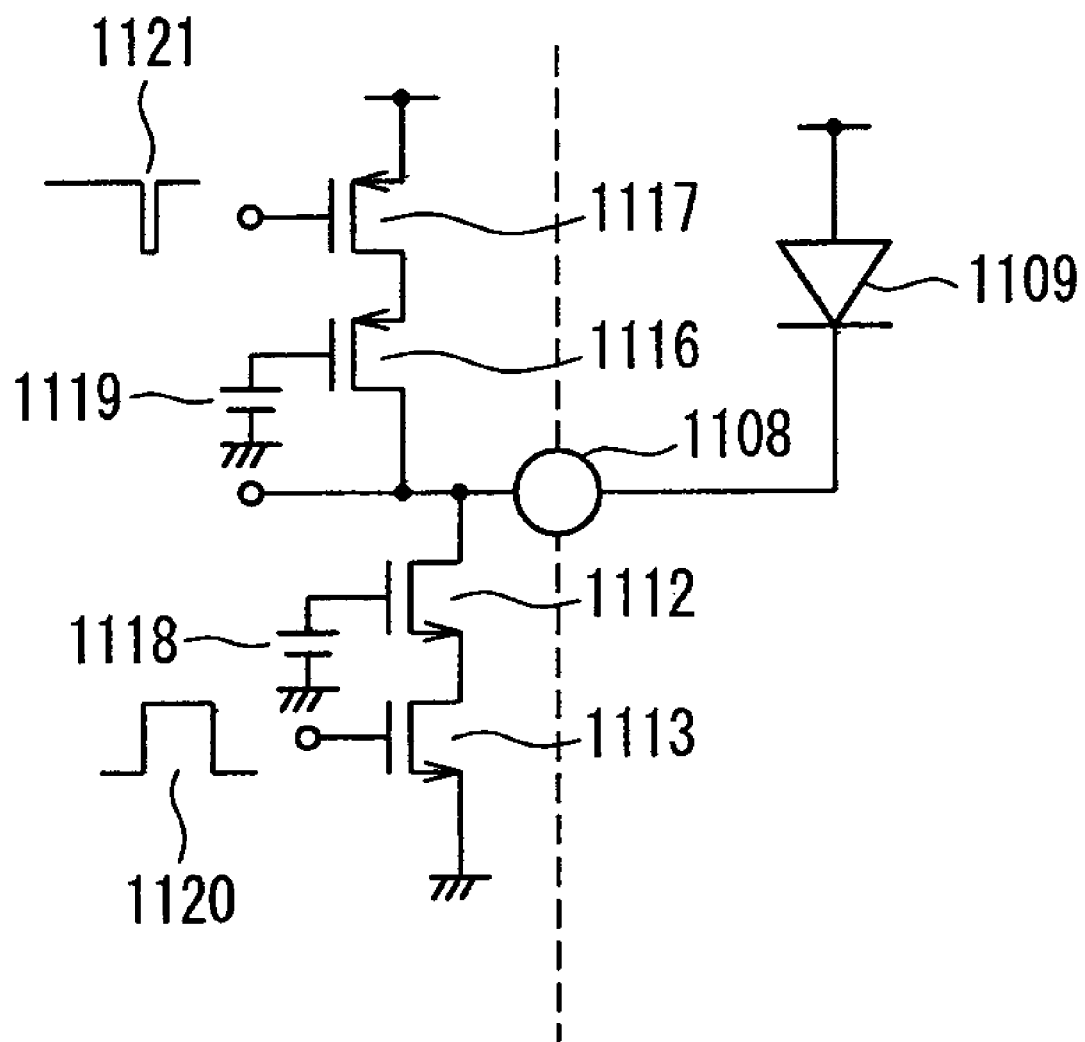
FIG. 11 is a circuit diagram showing a configuration of a conventional laser drive circuit.
Figure 12:
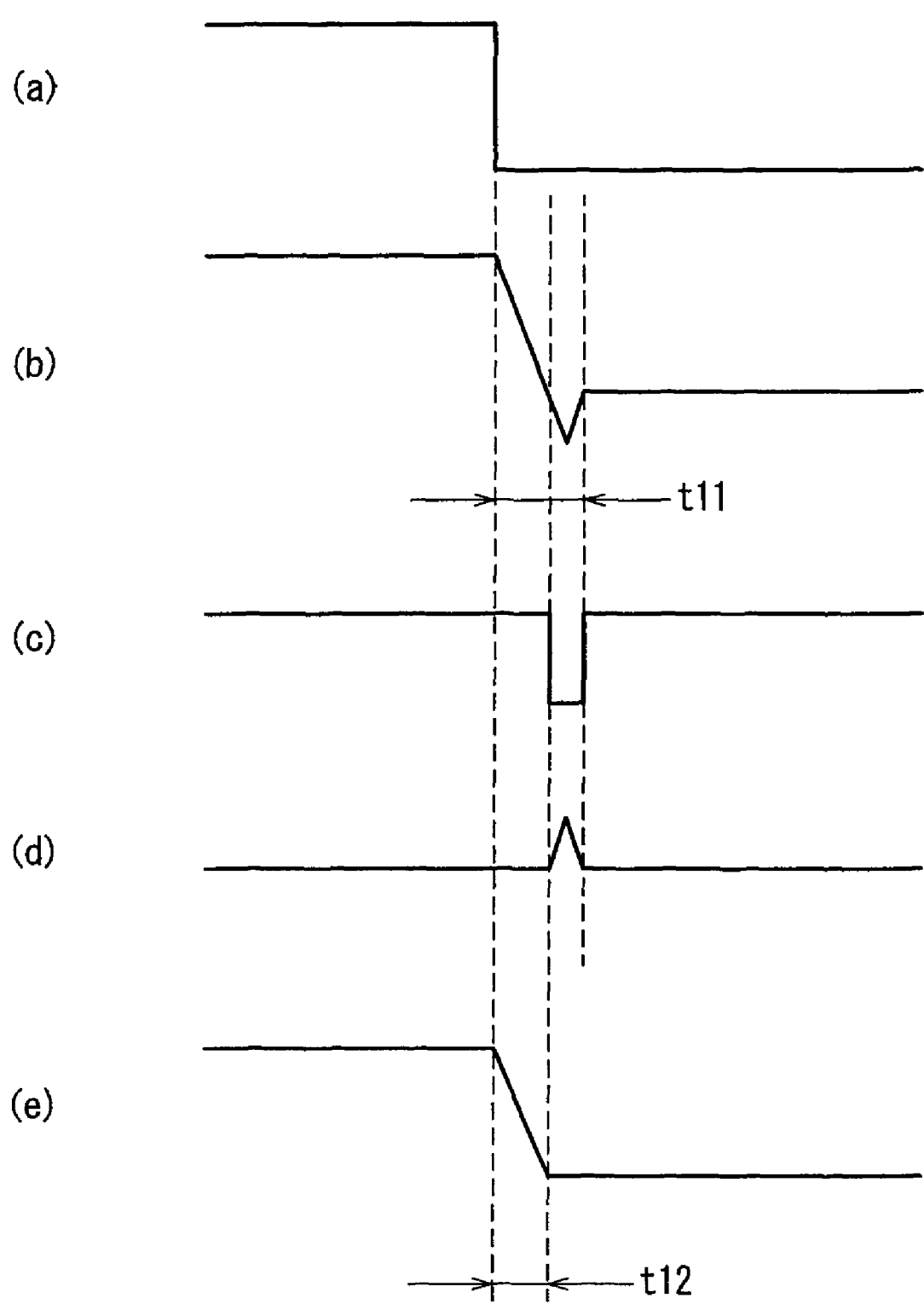
FIG. 12 is a waveform diagram showing the recorded waveforms of a conventional laser drive circuit.

FIG. 10 is a circuit diagram showing a configuration of a laser drive circuit according to a sixth embodiment of the present invention. The laser drive circuit of this embodiment has a circuit configuration in which the current mirror circuit of the second embodiment shown in FIG. 4 is formed with p-chMOS transistors so as to reverse the polarity of the output current, and a first drive circuit 1005 and a second drive circuit 1006 each discharge a current into a laser diode 1009. In FIG. 10, a detailed description of the same components as those of FIG. 4 will be omitted.

As shown in FIG. 10, the laser drive circuit includes variable current sources 1003 and 1004, the first drive circuit 1005, the second drive circuit 1006, a pulse output circuit 1007 and the laser diode 1009. The first drive circuit 1005 includes a current mirror circuit 1010. The second drive circuit 1006 includes a current mirror circuit 1011. The pulse output circuit 1007 outputs a short-period pulse according to a pulse control signal 1001. The laser diode 1009 outputs laser light according to the inputted current.

The first drive circuit 1005 includes a p-chMOS transistor 1021 (first transistor), a p-chMOS transistor 1022 (second transistor), a p-chMOS transistor 1023 (third transistor) and a p-chMOS transistor 1024 (fourth transistor). The p-chMOS transistor 1022 and the p-chMOS transistor 1024 together form the current mirror circuit 1010. The current mirror circuit amplifies the current value set by the variable current source 1003 to a current value necessary to drive the laser diode 1009. Between the drain of the p-chMOS transistor 1024 and ground, the p-chMOS transistor 1023 is connected in series. The pulse control signal 1001 is inputted into the gate of this p-chMOS transistor 1023, which switches on/off the output current at high speed.

The second drive circuit 1006 includes a p-chMOS transistor 1031 (fifth transistor), a p-chMOS transistor 1032 (sixth transistor), a p-chMOS transistor 1033 (seventh transistor), a p-chMOS transistor 1034 (eighth transistor), a p-chMOS transistor 1035 (ninth transistor) and a p-chMOS transistor 1036 (tenth transistor). The pulse output circuit 1007 is connected to the gate of the p-chMOS transistor 1035. A second pulse control signal 1002 is inputted into the gate of the p-chMOS transistor 1033.

The configuration shown in FIG. 10 can shorten the falling time even when the cathode of the laser diode 1009 is connected to a negative power source and the potential of the connecting terminal 1008 is lower than the ground potential.

The laser drive circuit of the present invention is useful in a laser drive technique for achieving a fast falling of recorded pulse waveforms regardless of the relationship between the voltage of a laser connecting terminal and the power source voltage of a drive circuit or the relationship between the voltage of a laser connecting terminal and a ground voltage by reducing the bias current of recorded waveforms that flows constantly at the time of falling of pulse waveform.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A laser drive circuit that generates a drive current for driving a laser diode according to inputted first and second variable currents and inputted first and second pulse control signals, the laser drive circuit comprising:
   a first drive circuit receiving an input of the first variable current and the first pulse control signal and outputting a first drive current in synchronism with the first pulse control signal;
   a pulse output circuit outputting a pulse signal in response to a falling edge of the first pulse control signal; and
   a second drive circuit receiving an input of the second variable current and the second pulse control signal, generating a second drive current in synchronism with the second pulse control signal, with decreased current value at least in synchronism with the pulse signal,
   wherein the laser diode is driven by a current obtained by adding the output current of the first drive circuit and the output current of the second drive circuit.

2. The laser drive circuit according to claim 1, wherein the first or second drive circuit amplifies the variable current, turns on/off the output according to the pulse control signal and changes the current with the pulse output circuit.

3. The laser drive circuit according to claim 1, wherein the pulse output circuit comprises a high pass filter.

4. The laser drive circuit according to claim 1, wherein the pulse output circuit comprises a pulse signal generating circuit using an inverter delay.

5. The laser drive circuit according to claim 1, wherein the output level of the pulse output circuit is controlled by a current value of the variable current.

6. The laser drive circuit according to claim 1, wherein the first drive circuit comprises a first transistor, a second transistor, a third transistor and a fourth transistor,
   each of the transistors being a three-terminal transistor including a first terminal, a second terminal and a third terminal, in which a current flows from the first terminal to the third terminal according to a voltage between the second terminal and the third terminal,
   the second terminal of the first transistor is connected to a power source,
   the first transistor is connected in series between the third terminal of the second transistor and ground,
   the first terminal of the second transistor is connected to a first variable current source,
   the first and second terminals of the second transistor are connected to each other,
   the first pulse control signal is inputted into the second terminal of the third transistor,
   the third transistor is connected in series between the third terminal of the fourth transistor and ground,
   the first terminal of the fourth transistor is connected to the laser diode, and
   the second terminal of the fourth transistor is connected to the second terminal of the second transistor.

7. The laser drive circuit according to claim 1, wherein the second drive circuit comprises a first transistor, a second transistor, a third transistor, a fourth transistor, a fifth transistor and a sixth transistor,
   each of the transistors being a three-terminal transistor including a first terminal, a second terminal and a third terminal, in which a current flows from the first terminal to the third terminal according to a voltage between the second terminal and the third terminal,
   the second terminal of the first transistor is connected to a power source,
   the first transistor is connected in series between the third terminal of the second transistor and ground,
   the first terminal of the second transistor is connected to a second variable current source,
   the first and second terminals of the second transistor are connected to each other,
   the second pulse control signal is inputted into the second terminal of the third transistor,
   the third transistor is connected in series between the third terminal of the fourth transistor and ground,
   the first terminal of the fourth transistor is connected to the laser diode,
   the second terminal of the fourth transistor is connected to the second terminal of the second transistor,
   the second terminal of the fifth transistor is connected to an output terminal of the pulse output circuit,
   the fifth transistor is connected in series between the third terminal of the sixth transistor and ground,
   the first terminal of the sixth transistor is connected to the laser diode, and
   the second terminal of the sixth transistor is connected to the second terminal of the second transistor and the second terminal of the fourth transistor.

8. The laser drive circuit according to claim 1, wherein the second drive circuit comprises a first transistor, a second transistor, a third transistor, a fourth transistor, a fifth transistor and a sixth transistor,
   each of the transistors being a three-terminal transistor including a first terminal, a second terminal and a third terminal, in which a current flows from the first terminal to the third terminal according to a voltage between the second terminal and the third terminal,
   the second terminal of the first transistor is connected to a power source,
   the first transistor is connected in series between the third terminal of the second transistor and ground,
   the first terminal of the second transistor is connected to a second variable current source,
   the first and second terminals of the second transistor are connected to each other,
   the second pulse control signal is inputted into the second terminal of the third transistor,
   the third transistor is connected in series between the third terminal of the fourth transistor and ground, the first terminal of the fourth transistor is connected to the laser diode,
the second terminal of the fourth transistor is connected to the second terminal of the second transistor,
the second terminal of the fifth transistor is connected to an output terminal of the pulse output circuit,
the fifth transistor is connected in series between the third terminal of the sixth transistor and ground,
the first terminal of the sixth transistor is connected to the first terminal of the second transistor, and
the second terminal of the sixth transistor is connected to the second terminal of the second transistor and the second terminal of the fourth transistor.

9. The laser drive circuit according to claim 1,
wherein the second drive circuit comprises a first transistor, a second transistor, a third transistor, a fourth transistor, a fifth transistor and a sixth transistor,
each of the transistors being a three-terminal transistor including a first terminal, a second terminal and a third terminal, in which a current flows from the first terminal to the third terminal according to a voltage between the second terminal and the third terminal,
the second terminal of the first transistor is connected to a power source,
the first transistor is connected in series between the third terminal of the second transistor and ground,
the first terminal of the second transistor is connected to a second variable current source,
the first and second terminals of the second transistor are connected to each other,
the pulse control signal is inputted into the second terminal of the third transistor,
the third transistor is connected in series between the third terminal of the fourth transistor and ground,
the first terminal of the fourth transistor is connected to the laser diode,
the second terminal of the fourth transistor is connected to the second terminal of the second transistor,
the second terminal of the fifth transistor is connected to an output terminal of the pulse output circuit,
the fifth transistor is connected in series between the third terminal of the sixth transistor and ground,
the first terminal of the sixth transistor is connected to the first terminal of the second transistor, and
the second terminal of the sixth transistor is connected to the second terminal of the second transistor of the first drive circuit.

10. A laser driving method comprising the steps of:
(1) amplifying a first variable current source to turn on/off an output according to a first pulse control signal,
(2) amplifying a second variable current source to turn on/off an output according to a second pulse control signal,
(3) generating a pulse signal in response to an edge of the first pulse control signal,
(4) changing a output current with the pulse signal, and
(5) adding the amplified currents and applying the added currents to a laser.

11. A recording/reading equipment comprising a laser drive circuit that generates a drive current for driving a laser diode according to inputted first and second variable currents and inputted first and second pulse control signals, the laser drive circuit comprising:
a first drive circuit receiving an input of the first variable current and the first pulse control signal and outputting a first drive current in synchronism with the first pulse control signal;
a pulse output circuit outputting a pulse signal in response to a falling edge of the first pulse control signal; and
a second drive circuit receiving an input of the second variable current and the second pulse control signal, generating a second drive current in synchronism with the second pulse control signal, and outputting a decreased current value of the second drive current at least in synchronism with the pulse signal,
wherein the laser diode is driven by a current obtained by adding the output current of the first drive circuit and the output current of the second drive circuit.

* * * * *